United States Patent Office 3,298,064
Patented Jan. 17, 1967

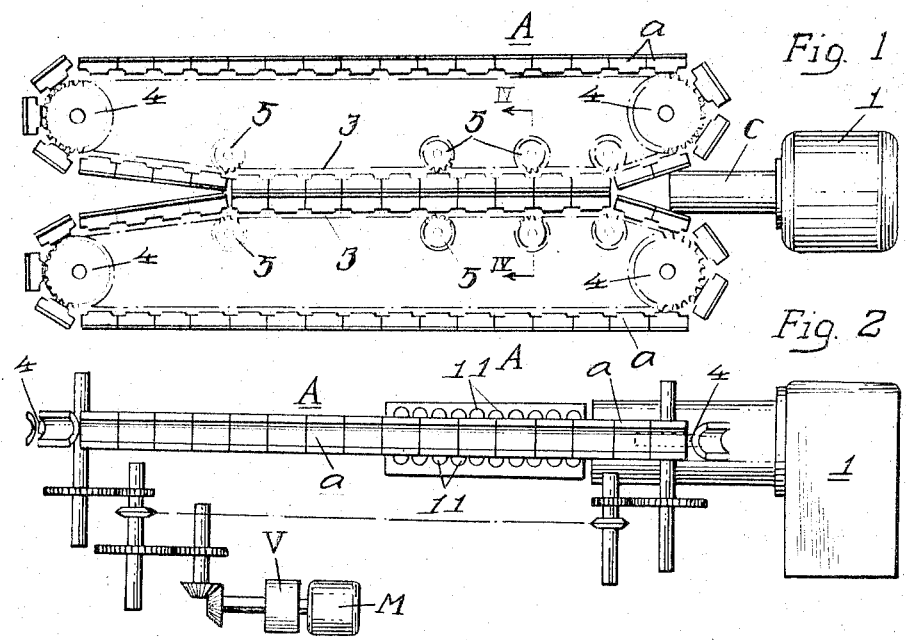

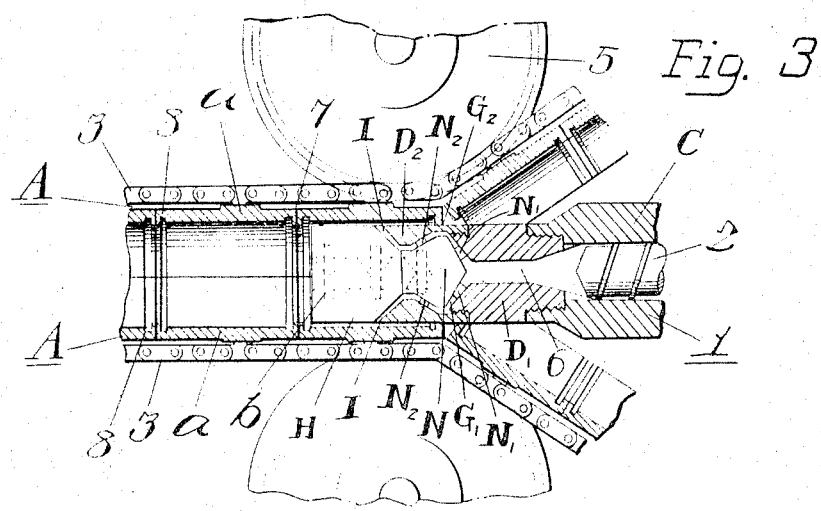
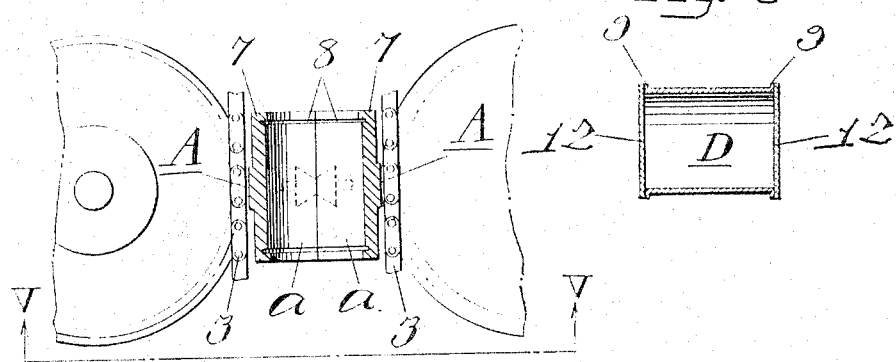
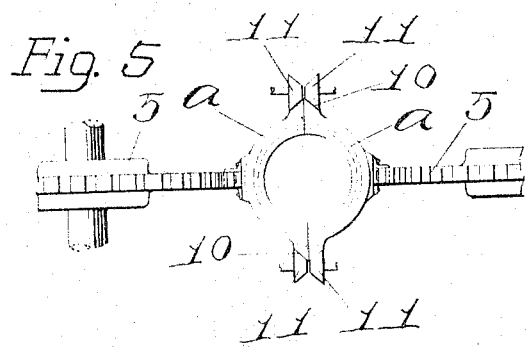

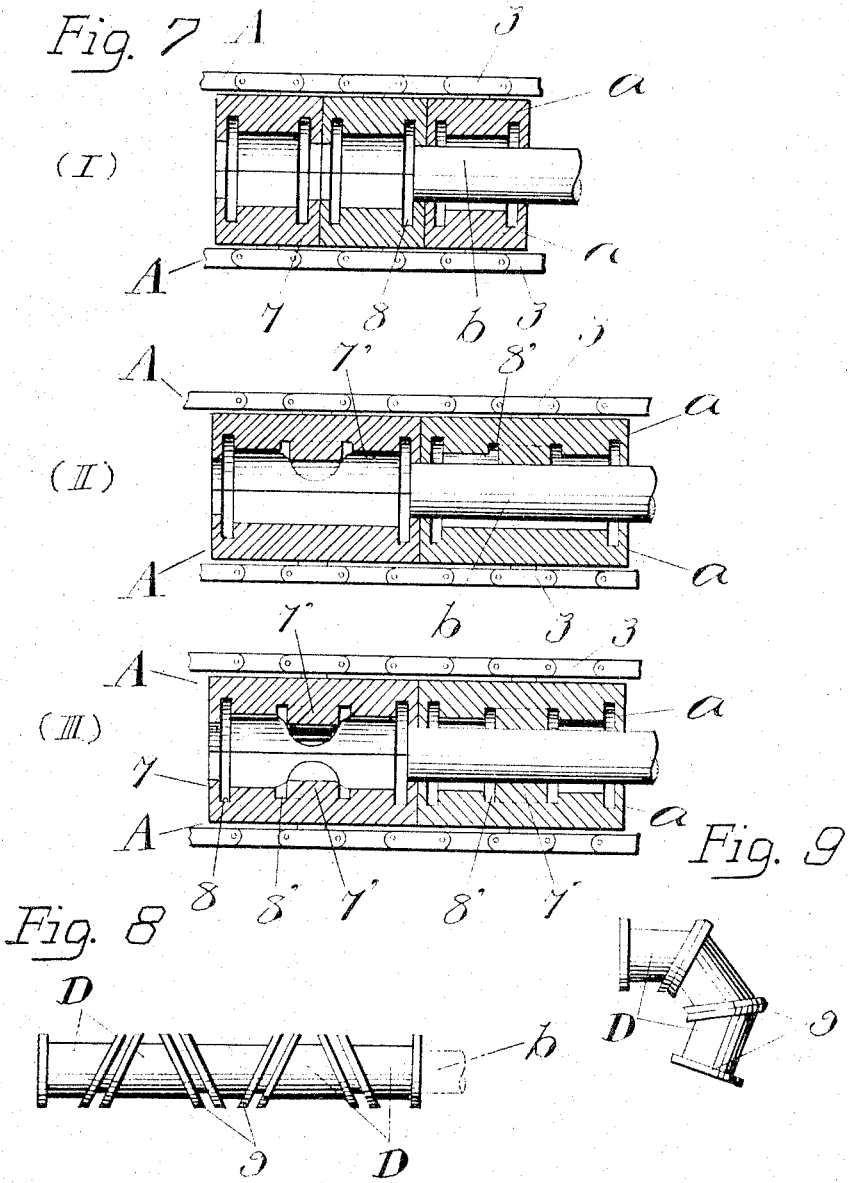

3,298,064
APPARATUS FOR MOLDING SYNTHETIC
RESIN BODIES
Jun Taga, 5664 Ikuta Kawasaki, Kanagawa-Prefecture, Japan
Filed Jan. 23, 1963, Ser. No. 253,421
10 Claims. (Cl. 18—14)

The present invention relates to an apparatus and method for molding plastic parts and in particular to a method of molding of synthetic resin bodies in succession by forming the bodies such as cylinders pipe couplings, bent pipe couplings or any other tubular or non-tubular bodies with thermal plastic resin by extruding a resin material in a plastic state into a cavity formed between inner and outer mold elements which are then moved relatively to each other and to an apparatus for molding the bodies.

One object of the present invention is to provide an apparatus for molding, in succession, of tubular synthetic resin bodies of round or multi-angular shapes, that is, the cross-section of which is of any desired shape.

Another object of this invention is to provide an apparatus for molding tubular synthetic resin bodies by extruding plasticized resin material into the gap formed between split molds and an inner mold, which is provided within said split molds.

Still another object of this invention is to provide an apparatus for molding tubular synthetic resin bodies in succession by using a plurality of split molds which are connected together on each of two chain conveyors arranged so that opposite complementary split molds are moved together over an inner mold member to receive the plasticized material in a cavity defined therebetween and to subsequently strip the molded body from the inner mold.

Still further, an object of this invention is to provide an apparatus for producing cylindrical bodies like pipe couplings or bent pipe couplings of synthetic resin by having the synthetic resin material molded by each of the split molds assembled in alignment.

Besides the objects as stated above, this invention provides an apparatus for molding non-tubular bodies of synthetic resin in succession, the cross-section of which is of any desired shape.

In consideration of the above objects and other objects that will be described hereinafter, each of the parts in the arrangement of the apparatus will be described in the following specification and be stated in the accompanying claims thereof.

In the accompanying drawings illustrating an embodiment according to the present invention, FIGS. 1-5 show an embodiment, wherein the molded cylinders are to be used for food packing, and of which, FIG. 1 is a side view of the whole apparatus, FIG. 2 the plan view thereof, FIG. 3 an enlarged sectional view of the material feed end of the apparatus, FIG. 4 the cross-sectional view through the line IV—IV of FIG. 1, and FIG. 5 a view as seen from the side of the line V—V of FIG. 4.

FIG. 6 is a cross-section of a finished product, FIG. 7 sections of the essential part of the molds, by which cylinders for pipe couplings are molded, and of which (I) is for a first straight-shaped pipe, (II) for T-shaped pipe, and (III) for cross-shaped pipe. FIG. 8, is an illustration for molding cylinders, which are used as couplings in bent piping, and FIG. 9 the plane view of said couplings assembled.

Describing the details of the apparatus with reference to the accompanying drawings, numeral 1 indicates an extruder having a screw 2 (FIG. 3). A pair of endless conveyors A, A each comprising split molds $a$ secured at spaced locations along chains 3 in a manner such that they will be substantially abutting when they are moved by their associated conveyor along a path in alignment with the extruder 1 over sprocket wheels 4, 4. The split molds $a$ are symmetrical semi-circular shaped halves in the embodiment of FIGS. 1–5. In the embodiment shown in FIG. 7 the split molds of the respective conveyors are non-symmetrical in any form according to the shape desired as in (I), (II) and (III) thereof. As shown in FIG. 8 the split molds for the configuration shown are non-symmetrical and alternately positioned.

The members or split molds $a$ are assembled to an endlessly continuous split mold conveyors A, A which include guide gears 5, 5 to guide the chains 3, 3 to insure alignment of the complementary split molds $a$ with the extruder 1.

The front end of the extruder 1 has an intermediate nozzle $D_1$ (FIG. 3), secured to the cylinder C. The nozzle $D_1$ has a bore 6 for guiding the supply of the raw material out of the cylinder C. The front end of the bore 6 is expanded and an intermediate mold N is installed in the expanded portion forming a gap or passage $G_1$ between the mold N and the nozzle $D_1$. The mold is held by supporting legs $N_1$, $N_1$, and in addition, a cover mold $D_2$ is over the intermediate nozzle $D_1$ so as to envelop the intermediate mold N. Thus, the front end of the nozzle $D_1$ is extended to an inner mold $b$, which extends outwardly from the mold N. A mold cavity is formed between the outer split molds $a$ and the inner mold $b$ into which the resin material is extruded to form the tubular bodies.

In the embodiment of this invention, for molding tubular body D (FIG. 6) by each set of the split molds $a$, annular projections 7 are formed on both ends of the split mold $a$ which will lie in contact with the surface of the inner mold $b$. In addition, annular recesses 8, 8 are formed on the front and rear ends of each split mold $a$ on respective inner sides of the projections 7, 7, whereby upper and lower flanges 9, 9 of the tubular body D are formed (FIG. 6). The finished tube D may be closed by sealing end flaps 12, 12 to the respective ends to form a sealed container.

In cases where the pipe couplings shown in (II) and (III) of FIG. 7, are to be molded, one or both of the split molds $a$ for each conveyor A, A are provided with an annular projection 7' or projections 7', 7' in the mid portion thereof. The respective outer sides thereof are provided with an annular recess 8' or recesses 8', 8' and flange 9' or flanges 9', 9'. As shown in FIG. 8 the flanges 9 of the tubular body D are made alternately inclined at opposite ends to form substantially a trapezoid in the plan view thereof. The tubular bodies thus molded are employable as bent pipe couplings by having them assembled as shown in FIG. 9.

The tubular body D may be provided with ribs, vertically and/or transversely, for the reinforcement of the product when necessary.

Also, inclined surfaces 10, 10 are formed on the side of each member of the split mold and both members $a$, $a$ of the split mold are oppositely assembled as shown in FIG. 5. Sets of tapered guide rings 11, 11 are provided alongside the parting plane of the split mold $a$ in order to hold the members $a$, $a$ together during the molding to prevent any misalignment or the leakage of resin. Cooling means such as a cold liquid shower or air blower (not shown) is provided in the midway of the apparatus to effect quick cooling of the material.

The sprocket wheels 4 for the endlessly continuous split mold conveyors A, A are driven by a motor M through a stepless speed change gear V which permits conveyor speed regulation to achieve optimum speed operation.

In the constitution of the apparatus as described above, when thermal plastic resin such as vinyl chloride, polyethylene, styrol or the like is thrown into the extruder 1 and is extruded by the screw 2 thereof, the resin is extruded and molded in a thermally melt state through the extrusion aperture I, I after passing along the intermediate nozzle $D_1$ secured to the front end of said extruder 1, and through the gaps $G_1$, $G_2$ between the intermediate mold N and the cover member $D_2$.

The sprocket wheels 4, 4 are rotated by the electric motor M to move the conveyors A, A at a slow speed, and consequently, the split molds $a$ of each conveyor travel one after another to engage around the inner mold $b$. The extruded plasticized material is supplied to the cavity between the split molds $a$ and the inner mold $b$. The sets of split molds $a$ move off the inner mold $b$ and carry the molded article with them which is cooled while travelling in sliding contact with the inner mold $b$. The guide gears 5, 5 bias the engaged split molds $a$, $a$ of the conveyors A, A together during the initial stages of the molding process during which the material is slidingly contacted firmly on the inner mold $b$. Leakage of the melt material is completely prevented by tapered guide rings 11, 11 which hold the mold sets together. The molded products D are produced rapidly in succession.

According to the described embodiments of the present invention, the molding is accomplished using molds which are moved in succession into a molding position, but the molding work may be performed independently and repeatedly with only a single set of split molds for example. In addition, the present invention includes also the method of molding of non-tubular bodies.

The molding method of the invention is very simple and the products are of low cost due to the quantity production thereof. Because the synthetic resin material than usual supplied more gradually into the mold when projections exist on the outer the strength of the products is increased accordingly.

In the foregoing, embodiments according to the present invention have been described however, it is apparent that this invention is not restricted to such embodiments but includes all of the construction of the apparatus within the scope of the claims accompanying herewith.

In describing the present invention as herein above, what is claimed as Letters Patent is:

1. An apparatus for molding synthetic resin bodies comprising an inner mold member, a plurality of complementary split mold members adapted to be fitted together around said inner mold member and to define with said inner mold member a mold cavity, an extruder for extruding resin material in a plastic form connected to said inner mold member and arranged to discharge resin material in a plastic condition into said mold cavity, said mold cavity having means for preventing flow of the extruded material adjacent each end thereof, and means for moving said split mold members relative to said inner mold member to first bring said mold members into engagement around said inner mold member and to thereafter move said split mold members relative to said inner mold member to remove a molded body from the inner mold member.

2. An apparatus according to claim 1 wherein said means for moving said split mold members includes a conveyor.

3. An apparatus according to claim 1 wherein said means for moving said split mold members includes first and second conveyors each having a plurality of split mold members thereon and being trained to move through separate paths to effect alignment of respective split mold members on each of said first and second conveyors around said inner mold at a location to define a cavity with said inner mold for receiving material extruded by said extruder into the cavity, said first and second conveyors being movable to thereafter move said split mold members away from said inner mold member and to carry the body molded in the cavity off said inner mold member.

4. An apparatus according to claim 1 including means disposed along the path of movement of said split mold members for holding said members in an interengaged position.

5. An apparatus according to claim 4 wherein said means for holding said split mold members in an interengaged position includes a cam surface formed on the exterior of said split mold member and roller means engaged with said cam surfaces for urging said respective mold elements of said conveyors into tight engagement.

6. An apparatus according to claim 1 wherein said mold elements when fitted together around said inner mold member define a cavity having a projection at each end for forming a flange on the article being molded.

7. An apparatus according to claim 6 wherein said mold cavities together form a T-shaped pipe.

8. An apparatus according to claim 6 wherein said split mold members when positioned together around said inner mold member form a substantially cross-shaped pipe body.

9. An apparatus according to claim 1 wherein said split mold members, when fitted together around said inner mold members, form at least one pipe section having an oblique flange portion adjacent at least one end thereof.

10. An apparatus according to claim 1 wherein said extruder includes a nozzle having a bore through which the material is extruded which widens at its outer end, said inner mold including a portion arranged in the widened end of said nozzle and defining a path with said nozzle for the flow of extrusion material, and an outer nozzle piece threaded onto said nozzle and holding said inner mold member in position in alignment with the bore of said nozzle.

References Cited by the Examiner

UNITED STATES PATENTS

| | | | |
|---|---|---|---|
| 3,035,302 | 5/1962 | Lysobey | 264—99 |
| 3,188,690 | 6/1965 | Zieg. | |
| 3,243,850 | 4/1966 | Zieg | 18—14 X |

FOREIGN PATENTS 61,855   12/1954   France.

ROBERT F. WHITE, *Primary Examiner.*

W. E. SCHULZ, L. S. SQUIRES, *Assistant Examiners.*